UNITED STATES PATENT OFFICE 2,308,287

PROCESS FOR THE MANUFACTURE OF HIGHLY ACTIVE SUBSTANCES FROM THE POSTERIOR LOBE OF THE HYPOPHYSIS

Karl Junkmann, Berlin, Germany, assignor to Schering Corporation, Bloomfield, N. J., a corporation of New Jersey No Drawing. Application December 12, 1938, Serial No. 245,229. In Germany December 14, 1937

1 Claim. (Cl. 167—74)

This invention relates to highly active substances from the posterior lobe of the hypophysis and a process of making the same.

The production of active substances from the posterior lobe of the hypophysis is already known from the literature. Thus Trendelenburg, Die Hormone, volume I, pages 133-173, published 1929, in Berlin, discloses particularly on page 141, that the posterior lobe of the hypophysis contains physiologically active principles that increase the blood pressure and that directly stimulate muscular tissue such as the uterus. Fühner "Zeitschrift für die gesamte experimentelle Medizin" vol. I, page 399/400—1913, "Therapeutische Halbmonatshefte" 34/1920, page 437, and also other authors employed for the precipitation of the active substances from aqueous extracts of posterior lobe phosphotungstic acid. It is true that thereby an active precipitate was obtained but it was not possible to separate or isolate in good yield from such a precipitate the individual active substances, compare Abderhalden "Handbuch der biologischen Arbeitsmethoden" vol. V, part 3, page 1027-1029, 1936. It is further known (German Patent No. 264,119) that from previously purified, albumen-free hypophysis extracts by precipitation with heavy metal salts, in particularly mercury salts, the active constituents can be precipitated and after removal of the metal can be obtained in solid form. According to this process, however, only a small yield is obtained.

In accordance with the present invention a highly active preparation is obtained in solid form and practically quantitative yield when the active precipitate obtained by precipitation with acid precipitating agents is freed from the precipitating agent by treating the precipitate with a solution or suspension of a base in aqueous organic solvents for the active substances at a temperature below 0° C., suitably below —10° C.

Particularly good results are obtained when the precipitation of the active substances is carried out by means of phospho-tungstic acid, tungstic acid, molybdic acid, phosphomolybdic acid and others at low temperature and the acid employed for the precipitation is removed from the precipitate with aqueous alcoholic alkaline earth hydroxide solution or suspension, for example, with methyl alcoholic baryta solution at temperatures below 0° C. suitably below —10° C.

The end product is obtained in this manner in a very good yield and if desired purified by several reprecipitations exhibits the effects of the hormones contained in the starting material on uterus and on blood pressure.

The following example illustrates the invention:

Example 50 grams of hypophysis posterior lobe dry powder with 80,000 international units are boiled for 5 minutes with 2.5 litres of weak acetic acid (0.25%), filtered and the precipitate washed with water until the filtrate amounts to about 2.5 litres. After cooling of the filtrate to 0° C. it is precipitated with the calculated quantity of phosphotungstic acid (80 ccs. of 10% acid dissolved in 10% sulphuric acid), after 1 hour's standing the whole is centrifuged in a cold chamber and the precipitate washed with a small quantity of dilute (about 3%) phosphotungstic acid solution. The precipitate is then suspended in 400 ccs. of methyl alcohol cooled to —10° C. and treated with likewise correspondingly cooled methyl alcoholic saturated baryta solution to a distinctly alkaline reaction (phenol phthalein red), whereby about 100 ccs. are employed. After 30 minutes the whole is centrifuged in a cool chamber, the solution decanted, the precipitate washed with a little methyl alcohol and the combined methyl alcoholic solutions exactly neutralised for quantitative precipitation of the barium with dilute sulphuric acid, in which case suitably the completion of the precipitation is effected by the addition of a small quantity of solid sodium sulphate. The barium sulphate precipitate is filtered off and the filtrate if desired after weak acidification with acetic acid evaporated to dryness in a good vacuum. The residue is dissolved in 15 ccs. of glacial acetic acid, filtered for removal of insoluble salts and the filtrate precipitated with ether. The filtered precipitate in the completely dry condition is dissolved in 10 ccs. of glacial acetic acid (98%), the solution filtered clear, the filtrate treated with 40 ccs. of ether and the precipitate produced washed with ether and dried. Yield: 500-250 mg. of a white powder containing 60,000 international units of each of the hormonal substances acting on the uterus and on blood pressure. 1 mg. accordingly contains 240-120 international units, of the specified main activities.

The preparation thus obtained can be employed directly as pharmaceutical product, however, also the substance raising the blood pressure contained therein can be separated without difficulty and employed separately.

Of course, many changes and variations in the reaction conditions and the like may be employed by those skilled in the art in accordance with the principles set forth herein and in the claim annexed hereto.

What I claim is:

In a process for separating physiologically highly active substances from a precipitate resulting from the action upon a liquid extract of the posterior lobe of the hypophysis of an acid selected from the group consisting of phosphotungstic acid, tungstic acid, molybdic acid, and phosphomolybdic acid, the steps comprising suspending said precipitate in a chilled, water-miscible organic solvent for the active substances, treating the suspension with a saturated solution of barium hydroxide in aqueous methyl alcohol cooled to a temperature no higher than about $-10°$ C. to liberate the physiologically active substances and form an insoluble barium salt of the acid precipitating agent, separating the solution of active substances from the insoluble barium salt, treating the solution of active substances with precisely enough dilute sulfuric acid to neutralize and precipitate any barium hydroxide present as barium sulfate, removing the barium sulfate, and evaporating the solution to dryness, and subjecting the resulting residue containing the physiologically active substances to at least one purification treatment consisting of dissolving the residue in an organic acid, filtering, precipitating the active substances from the filtrate, separating and drying the precipitate, and finally isolating from the mixture of active substances in the precipitate a principle having as its chief property the raising of the human blood pressure and a principle having as its chief property a direct stimulating action on the muscular tissue of the uterus.

KARL JUNKMANN.